US000001357H

United States Statutory Invention Registration [19]

[11] Reg. Number: H1357

Ng et al.

[43] Published: Sep. 6, 1994

[54] ACTIVE SOUND CANCELLATION SYSTEM FOR TIME-VARYING SIGNALS

[75] Inventors: Kam W. Ng, Barrington; Henry A. Leinhos, Newport, both of R.I.

[73] Assignee: The United States of America as represented by the Secretary of the Navy, Washington, D.C.

[21] Appl. No.: 573,415

[22] Filed: Aug. 27, 1990

[51] Int. Cl.[5] ..... G10K 11/16; H04R 1/28

[52] U.S. Cl. ..... 381/71; 367/901

[58] Field of Search ..... 381/71, 86

[56] References Cited

U.S. PATENT DOCUMENTS

| | | | |
|---|---|---|---|
| 4,677,677 | 6/1987 | Eriksson | 381/71 |
| 4,783,817 | 11/1988 | Hamada et al. | 381/71 |
| 4,878,188 | 10/1989 | Ziegler, Jr. | 381/71 |
| 4,965,832 | 10/1990 | Edwards et al. | 381/71 |
| 4,987,598 | 1/1991 | Eriksson | 381/71 |
| 5,022,082 | 6/1991 | Eriksson et al. | 381/71 |
| 5,029,218 | 7/1991 | Nagayasu | 381/71 |

*Primary Examiner*—Daniel T. Pihulic
*Attorney, Agent, or Firm*—Michael J. McGowan; Prithvi C. Lall

[57] ABSTRACT

In a fluidborne or structureborne sound system, a method and apparatus are provided for actively canceling transient acoustic noise. A high-speed controller utilizes a weighted combination of open and closed-loop inputs to provide a correction signal to a cancellation source. The cancellation source introduces a canceling acoustic wave that is equal in amplitude but 180° out of phase with respect to the acoustic noise in order to cancel the acoustic noise within the system. The open-loop input is provided by a database containing a predicted, off-line model of the acoustic noise. The closed-loop input is provided by a combination of 1) an input signal generated by the input acoustic wave and feedback from the cancellation source as measured by an input sensor and 2) an error signal generated at the output of the system as measured by an error sensor. The weighted combination of the open and closed-loop inputs is chosen to minimize the error signal.

18 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACTIVE SOUND CANCELLATION SYSTEM FOR TIME-VARYING SIGNALS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to an active noise cancellation system and in particular to an active noise cancellation system for time-varying signals.

(2) Description of the Prior Art

Various noise control techniques have been utilized to reduce both fluidborne and structureborne noise. Generally, noise control techniques aim at the suppression of noise sources or the reduction of sound propagation and transmission. However, noise source suppression methods involve redesign and modification of the system and thus may effect system performance. Furthermore, noise reduction methods that attenuate sound in the propagation and transmission paths approach the problem indirectly and have proven ineffective.

Another approach, known as the active noise control concept has been developed to reduce or possibly cancel the unwanted sound generated from pressure fluctuations in a fluid medium or vibrations in a structure. This approach is currently being used to cancel steady-state noise signals in piping systems, structural vibration noise in aircraft fuselages and background noise in communication links. The basic concept of active noise control involves the use of interfering waves from another source identical to the noise signal except for being phase shifted by 180° to cancel the sound field of the noise source. These basic concepts of active noise control were first introduced in 1936 by Lueg in U.S. Pat. No. 2,043,413 which is herein incorporated by reference.

More recently, prior art active noise cancellation systems have made use of various filter models in attempting to cancel out a noise source. For example, in steady-state signal systems, filter models of the expected noise signals are easily estimated. The models are then employed in an open-loop system to apply a correction signal to introduce the noise cancellation wave. The noise cancellation wave is shifted by 180° with respect to the predicted noise thereby canceling the noise signal. However, many noise signals are not so easily predicted.

In FIG. 1, a closed-loop approach to active noise cancellation involves a noise source exciting a fluid-filled duct 10. The fluid flow 11 through an orifice 12 includes turbulent flow noise 13 generated by a confined fluid jet 14 which is propagated down the duct 10. Ideally, noise measured at a detector hydrophone 15 could be canceled with a similar signal shifted by 180° and introduced at a cancellation source 17 such as an omni-directional sound projector. Practically though, implementation of a 180° phase shift introduces a time delay that corresponds to a physical distance of sound propagation further down the duct 10. Thus, in addition to the 180° phase shift, the response of the duct 10 from the input hydrophone 15 to the cancellation source 17 must be anticipated.

A convenient method of describing this problem is in terms of the joint process estimation problem, as outlined in FIG. 2. The joint process estimator uses an input vector y(T) to estimate another vector d(T) by passing y(T) through an adaptive filter 20. The adaptive filter response is adjusted such that an error output e(T) is minimized. In this case, d(T) corresponds to the noise present at the cancellation source 17 in FIG. 1, while the vectors y(T) and e(T) correspond to the noise measured at the input and error hydrophones 15 and 19, respectively, which are then used as inputs for adaptive filter 20. The function of adaptive filter 20 is typically accomplished with a processor or controller 30 shown in FIG. 1.

The closed-loop adaptive filter approach is described in detail by Eriksson in U.S. Pat. Nos. 4,677,676 and 4,677,677. In Eriksson, adaptive filter models are used to generate an on-line compensation of the noise signal. The adaptive filter model is employed in a closed-loop system to apply a correction signal to an omni-directional speaker. The speaker introduces the noise cancellation wave into the acoustic system. The filter model in Eriksson adaptively models direct, feedback and error paths on an on-line basis. Recursive least mean squares and least mean squares algorithms are employed in the filters' transfer functions. While these and other closed loop systems adapt to time-varying signals, the response time is on the order of minutes. Thus, time-varying noise signals having much shorter time constants are not effectively canceled by any of the prior art active noise control systems.

SUMMARY OF THE INVENTION

Accordingly, it is an object of the present invention to provide a method and apparatus for active noise cancellation of time-varying signals whose system response time is on the order of seconds.

Another object of the present invention is to provide a method and apparatus for active noise cancellation that can effectively reduce either fluidborne or structureborne noise.

Other objects and advantages of the present invention will become more obvious hereinafter in the specification and drawings.

In accordance with the above objects, an active noise cancellation apparatus and method are provided for a sound system capable of propagating fluidborne and structureborne noise. The system has an input for receiving an acoustic signal from a noise source and an output for radiating an output acoustic signal. A canceling acoustic signal is introduced into the system from a cancellation source. An input hydrophone senses a combination of the input acoustic signal from the source and feedback from the cancellation signal to provide an input signal. An error hydrophone senses a combination of the output acoustic signal and the canceling acoustic signal to provide an error signal. A database is also provided with predicted, off-line model parameters of the acoustic noise. Finally, a controller is used to model the system based upon 1) a model input that is a weighted combination of the input signal and the predicted, off-line model parameters and 2) an error input of the error signal. Both the input and the error signals are closed-loop inputs while the predicted off-line model parameters are open-loop inputs to the controller. The controller also outputs a correction signal to the cancellation source which in turn produces the canceling acoustic signal. The error signal is minimized by the weighted combination of the closed-loop and open-loop inputs.

DESCRIPTION OF THE PREFERRED EMBODIMENT(s)

Figure 1:
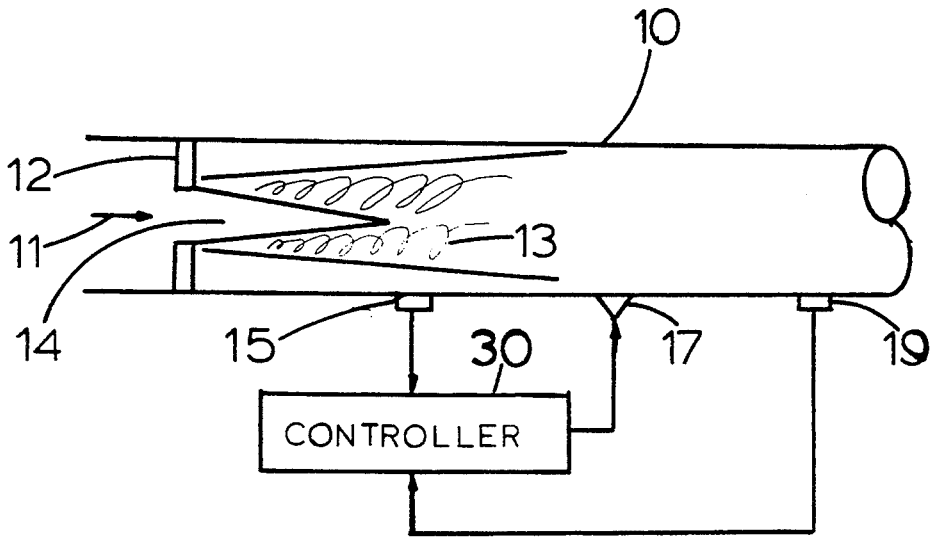
FIG. 1 is a schematic representation of a closed-loop active noise cancellation system for a fluid-filled duct.
Figure 2:
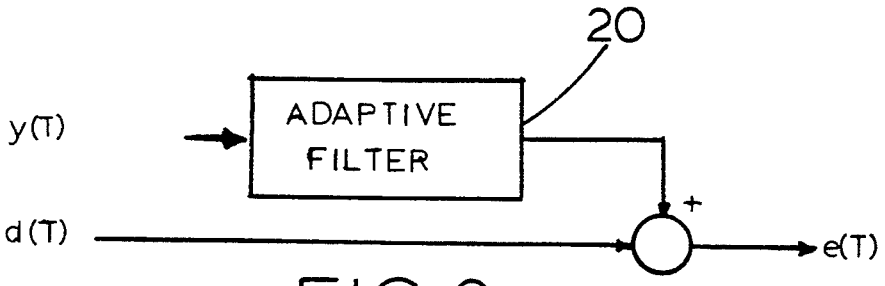
FIG. 2 is a schematic representation of the joint process estimator employed in a closed-loop active noise cancellation system.
Figure 3:
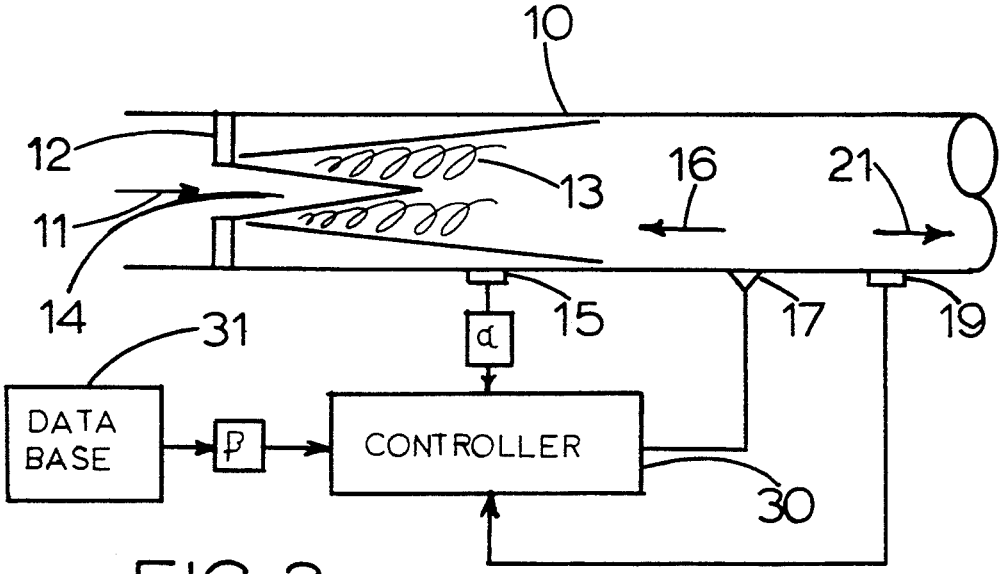
FIG. 3 is a schematic representation of the active noise cancellation system according to the present invention.

Referring now more particularly to FIG. 3, a schematic representation is shown of the active noise cancellation system according to the present invention. FIGS. 1 and 3 share common elements and will share common reference numerals for ease of description. While the invention will be described for fluidborne noise in a fluid-filled duct 10, it is not so limited. Indeed, as will be apparent from the description to follow, the basic principles of the present invention apply equally as well to structureborne noise reduction and flow field modification.

The fluid flow, indicated generally by the arrow referenced by numeral 11, passes through an orifice 12 thereby producing a confined fluid jet 14 that produces turbulent flow noise referenced by numeral 13. The total flow noise 13 includes nonstationary acoustic signals induced by the transient flow conditions. Cancellation of this noise is necessary in order to maintain the flow performance of the duct 10.

For purposes of description, it will be assumed the turbulent flow noise 13 is in the form of an acoustic wave. Accordingly, an input acoustic wave in duct 10 is sensed by an input sensor such as an input hydrophone 15 in the case of the fluidborne sound system. Input hydrophone 15 also senses feedback, indicated generally by arrow 16, from cancellation source 17 to provide an input signal. Cancellation source 17 introduces a canceling acoustic wave into the duct 10 equal in amplitude but phase shifted by 180° with respect to the input noise to thus cancel same. For the system being described, cancellation source 17 is typically an omnidirectional sound projector. An error sensor such as an error hydrophone 19 is used to measure the output acoustic wave, indicated generally by arrow 21, and provide an error signal.

A controller 30 is used to model the system and outputs a correction signal to cancellation source 17. In a closed-loop mode, controller 30 models the system based upon: 1) previous model inputs from input hydrophone 15, 2) previous model outputs which are a weighted sum of previous inputs and outputs, and 3) an error input from error hydrophone 19. The weighted sum of previous model inputs and outputs appears as the feedback 16. In an open-loop mode, controller 30 models the system based upon inputs from a database 31 of predicted, off-line model parameters of the noise to be canceled. Controller 30 applies a weighted combination of the closed-loop and open-loop modeling. A weighting factor $\alpha$ is used to determine the percentage of the correction signal that will be used in the closed-loop response. In contrast, a weighting factor $\beta$ is used to determine the percentage of the correction signal that will be used in the open-loop input from database 31. For example, when $\alpha$ and $\beta$ equal 1, the correction signal issued to cancellation source 17 26 will be based on a 50 percent closed-loop and 50 percent open-loop response. When $\alpha$ equals 0 and $\beta$ equals 1, the correction signal is based solely on an open-loop response. Similarly, when $\alpha$ equals 1 and $\beta$ equals 0, the correction signal is based solely on a closed-loop response. The settings of $\alpha$ and $\beta$ are based upon growth and decay rates of the time-varying signals and are chosen to minimize the error signal. The values of $\alpha$ and $\beta$ range from 0 to 1 and are determined experimentally.

The open/closed-loop concept decreases the response time of the system compared to conventional active sound cancellation systems. Specifically, since the database 31 has a predicted, off-line model that provides an approximate solution to the controller 30, the closed-loop portion of the system can be used to "fine tune" the system response. Thus, the controller 30 partially solves the problem of determining the cancellation signal before the system is even activated. This speeds up the solution searching and convergence process thereby reducing the overall system response time.

Controller 30 is typically a digital signal processor whose design is dictated by the time constants of the noise to be canceled and the algorithms used to model the system. In the case of time-varying signals, two standard statistical algorithms may be alternatively used to adaptively model the system for both the closed-loop response and for the predicted model used in the open-loop response. The first of these algorithms is the auto regression with moving average algorithm or ARMA.

$$Y_n = -\sum_{i=1}^{P} a_i y_{n-i} + \sum_{i=1}^{q} b_i \mu_{n-i}$$

A detailed description of the ARMA algorithm can be found in "Unbiased Recursive Identification Using Model Reference Adaptive Techniques" by I. D. Landau, *IEEE Transactions on Automatic Control,* Vol. AC-21, No. 2, pp. 194–202, April 1976, and is herein incorporated by reference.

The second algorithm is the auto regression with moving average plus exogenous input algorithm or ARMAX.

$$Y_n = -\sum_{i=1}^{P} a_i y_{n-i} + \sum_{i=1}^{q} b_i \mu_{n-i} + \sum_{i=1}^{r} c_i N_{n-i} + N_n$$

A detailed description of the ARMAX algorithm can be found in "The Convergence of AML" by V. Solo, *IEEE Transactions on Automatic Control,* Vol. AC-24, No. 6, pp. 958–962, December 1979, and is herein incoporated by reference. For both algorithms, $Y_n$=output at cancellation source 17, $U_n$=input at input hydrophone 15, $a_i$, $b_i$, $c_i$=coefficients of optimization, $N_n$=white noise, and p, q and r=number of terms or order.

To further increase the speed capabilities of the present invention, controller 30 might employ parallel processing techniques in the closed-loop portion of the system.

While the present invention has been described for the fluidborne sound system, it is not limited thereto. The same active noise cancellation system can be used for structureborne noise reduction and flow field modification. For example, in a case of structureborne noise, the input and error sensors might be accelerometers and the cancellation source might be a vibration source generator. In the flow field case, the input and error sensors might be hot wire probes or laser Doppler velocimeters(LDV) and the cancellation source might be a sound projector.

The advantages of the present invention are numerous. By employing a weighted combination of open and closed-loop inputs to a high-speed controller, the method and apparatus of the present invention cancels time-varying signals. The open-loop input provides an approximate solution to he controller while the closed-loop input fine tunes the system response in order to reduce the system response time. The system is capable of being adjusted to cover a wide range of time-varying signals to steady-state signals depending upon the weighted combination. Furthermore, because the present invention is an active noise cancellation system, it has minimal impact on system performance. Finally, the concepts taught by the present invention apply equally as well to either fluidborne or structureborne noise.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for actively canceling acoustic noise in a fluidborne or structureborne sound system by introducing a canceling acoustic wave into said system from a cancellation source and for adaptively compensating for feedback to said input from said cancellation source, said system having an input for receiving an input acoustic wave and an output for radiating an output acoustic wave, comprising:

a database having a predicted, off-line model or the canceling acoustic wave;

an input sensing means for sensing the combination of said input acoustic wave and said feedback to said input and for providing an on-line input signal indicative thereof;

an error sensing means for sensing the combination of said output acoustic wave and said canceling acoustic wave and for providing an error signal indicative thereof; and a controller means for adaptively modeling said system based upon a model input and an error input, said model input comprising a combination of: 1) a selected percentage of said on-line input signal and 2) a selected percentage of said offline model, and said error input comprising said error signal, said controller means further outputting a correction signal to said cancellation source to introduce said canceling acoustic wave such that said error signal is minimized by said model input, wherein said selected on-line input signal percentage and said selected off-line model percentage are complementary percentages.

2. An apparatus as in claim 1 wherein said controller means comprises a parallel processor.

3. An apparatus as in claim 1 wherein said input sensing means and said error sensing means comprise accelerometers for a structureborne sound system.

4. An apparatus as in claim 1 wherein said input sensing means and said error sensing means are hydrophones for a fluidborne sound system.

5. An apparatus as in claim 1, wherein said input sensing means and said error sensing means are hot wire probes.

6. An apparatus as in claim 1 wherein said input sensing means and said error sensing means are laser Doppler velocimeters.

7. An apparatus as in claim 1 wherein said cancellation source is an omni-directional sound projector.

8. An apparatus as in claim 1 wherein said controller means comprises an algorithm means having said selected percentage of said on-line input signal as a first input, said selected percentage of said off-line model as a second input, said error signal as a third input and an output providing said correction signal to said cancellation source.

9. An apparatus as in claim 8 wherein said algorithm means uses an auto regression with moving average algorithm.

10. An apparatus as in claim 8 wherein said algorithm means uses an auto regression with moving average plus exogenous input algorithm.

11. An apparatus as in claim 1 wherein said database is generated with the aid of an auto regression with moving average algorithm.

12. An apparatus as in claim 1 wherein said database is generated with the aid of an auto regression with moving average plus exogenous input algorithm.

13. A method for actively canceling acoustic noise in a fluidborne or a structureborne sound system, said system having an input for receiving an input acoustic wave and an output for radiating an output acoustic wave, by introducing a canceling acoustic wave from a cancellation source and for adaptively compensating for feedback to said input from said cancellation source, comprising the steps of:

providing a database having a predicted, off-line model of the canceling acoustic wave;

sensing a combination signal based on the combination of said input acoustic wave and feedback from said cancellation source;

sensing an error signal based on the combination of said output acoustic wave and said canceling acoustic wave from said cancellation source;

selecting a percentage of said combination signal and a percentage of said off-line model, wherein said combination signal percentage and said off-line model percentage are complementary percentages;

modeling said system with a controller means having a model input and an error input, said model input comprising a combination of: 1) said selected percentage of said combination signal and 2) said selected percentage of said off-line model, and said error input comprising said error signal; and outputting a correction signal from said controller means to said cancellation source to introduce said canceling acoustic wave such that said error signal is minimized by said model input.

14. A method according to claim 13 wherein said predicted model is modeled with an auto regression with moving average algorithm.

15. A method according to claim 13 wherein said predicted model is modeled with an auto regression with moving average plus exogenous input algorithm.

16. A method according to claim 13 wherein said step of modeling is accomplished with an auto regression with moving average algorithm.

17. A method according to claim 13 wherein said step of modeling is accomplished with an auto regression with moving average plus exogenous input algorithm.

18. In a fluidborne or a structureborne sound system, said system having an input for receiving an input acoustic wave and an output for radiating output acoustic wave, a cancellation source for introducing a canceling acoustic wave into said system, an input sensor for generating an input signal from a combination of said input acoustic wave and feedback from said canceling acoustic wave, an error sensor for generating an error signal from a combination of said canceling acoustic wave and output acoustic wave, and a controller means for adaptively modeling said system based upon said input signal and said error signal whereby a closed-loop response to said system is generated, a method for actively canceling acoustic noise in said system comprising the steps of: providing said controller means with a predicted off-line model of the canceling acoustic wave;

selecting a percentage of said off-line model and a percentage of said closed-loop response, wherein said off-line model percentage and said closed-loop response percentage are complementary percentages;

combining said selected percentages of said off-line model and said closed-loop response to form a weighted combination; and outputting a correction signal to said cancellation source based upon said weighted combination whereby said cancellation source introduces said canceling acoustic wave into said system.

* * * * *